United States Patent [19]

Geke

[11] Patent Number: 4,629,477

[45] Date of Patent: Dec. 16, 1986

[54] COAGULATING COMPOSITIONS CONTAINING A CYANAMIDE COMPONENT FOR COAGULATING LACQUERS, WAXES AND COATING COMPOSITIONS

[75] Inventor: Juergen Geke, Duesseldorf, Fed. Rep. of Germany

[73] Assignee: Henkel Kommanditgesellschaft auf Aktien, Duesseldorf, Fed. Rep. of Germany

[21] Appl. No.: 716,800

[22] Filed: Mar. 28, 1985

[30] Foreign Application Priority Data

Apr. 5, 1984 [DE] Fed. Rep. of Germany ....... 3412763

[51] Int. Cl.$^4$ ..................... B01D 21/01; B03D 3/02; C02F 1/54; C02F 1/56
[52] U.S. Cl. ..................... 55/85; 210/705; 210/723; 210/729; 210/735; 252/180; 252/181; 55/89; 55/DIG. 46
[58] Field of Search ............... 252/156, 158, 180, 181; 210/712, 735, 705, 723, 729; 55/85, 89, DIG. 46

[56] References Cited

U.S. PATENT DOCUMENTS

| | | | |
|---|---|---|---|
| T965,001 | 12/1977 | Carbonne et al. | 210/52 |
| 3,498,913 | 3/1970 | Sellet | 210/54 |
| 3,617,570 | 11/1971 | Redmore | 524/922 |
| 3,723,148 | 3/1973 | Tupper | 106/287 |
| 3,822,205 | 7/1974 | Oohara et al. | 210/52 |
| 3,990,986 | 11/1976 | Gabel et al. | 252/315 |
| 4,045,377 | 8/1977 | Pearson | 260/2 BP |
| 4,067,806 | 1/1978 | Mauceri | 210/52 |
| 4,090,001 | 5/1978 | Mertzweiller et al. | 427/444 |
| 4,130,674 | 12/1978 | Roberts | 252/181 |
| 4,220,456 | 9/1980 | Block | 55/85 |
| 4,418,217 | 11/1983 | Schmid et al. | 568/593 |
| 4,425,238 | 1/1984 | Degen | 210/666 |
| 4,440,647 | 4/1984 | Puchalski | 210/712 |
| 4,504,395 | 2/1985 | Harpel | 210/712 |

FOREIGN PATENT DOCUMENTS

| | | |
|---|---|---|
| 1191418 | 8/1985 | Canada . |
| 0039859 | 2/1981 | European Pat. Off. . |
| 0079838 | 11/1982 | European Pat. Off. . |
| 2347068 | 4/1975 | Fed. Rep. of Germany . |
| 2182085 | 4/1973 | France . |
| 2263982 | 3/1975 | France . |
| 2319582 | 7/1976 | France . |
| 49-35191 | 9/1974 | Japan . |
| 1975461 | 2/1975 | Japan . |
| 53-119285 | 10/1978 | Japan . |
| 57-15807 | 1/1982 | Japan ................... 210/735 |
| 59-69112 | 4/1984 | Japan . |
| 7308528 | 6/1972 | Netherlands ............. 210/54 |
| 1068660 | 5/1967 | United Kingdom . |
| 1512022 | 5/1978 | United Kingdom . |

OTHER PUBLICATIONS

*Chemical Abstracts*, vol. 83, Sep. 22, 1975, p. 338, Abstract No. 102800s, Nakajima, M., "Chemistry of Dicyandiamide ... as a Coagulant".
European Search Report Application No. 85103765.5.
Chemical Abstracts vol. 83, No. 12 (9/22/75).
Chemical Abstracts, vol. 82, No. 14 (4/7/75).
Patent Specification 1,509,042 (Germany).
Patent Specification 973,534 (Great Britain).
Turkish Search Report, TR 16566/85.

*Primary Examiner*—Dennis L. Albrecht
*Attorney, Agent, or Firm*—Ernest G. Szoke; Nelson Littell, Jr.

[57] ABSTRACT

The invention relates to coagulating compositions for coagulating lacquers, waxes and coating compositions, more especially two-component polyurethane lacquers, which contain a mixture of cyanamide and/or dicyanodiamide and/or calcium cyanamide in an amount of from 1% to 80% by weight in conjunction with substances normally present in coagulating compositions.

7 Claims, No Drawings

COAGULATING COMPOSITIONS CONTAINING A CYANAMIDE COMPONENT FOR COAGULATING LACQUERS, WAXES AND COATING COMPOSITIONS

This invention relates to coagulating compositions for coagulating lacquers, waxes and coating compositions, more especially two-component polyurethane lacquers, said coagulating compositions containing cyanamide and/or dicyanodiamide and/or cyanamide salts in conjunction with substances normally present in coagulating compositions.

In the application of lacquers, waxes or similar coating compositions containing water-insoluble organic substances, for example in the automotive industry, it is not possible completely to apply the compositions to the parts to be coated, particularly when the compositions are applied by spraying. In the painting of motor vehicles in particular, so-called "overspray" accumulates in the paint spray cubicles, is removed from the cubicles with water and flushed into a socalled settling basin. In order, on the one hand, not to disturb the function of the water-carrying pipe, nozzle and sprinkling systems, for example by sticky paint particles, and on the other hand to remove the ingredients taken up from the circulating water, chemicals have to be added to the water to coagulate the substances mentioned. In this connection, separation of the sprayed paint particles taken up by the water and their agglomeration to form a dischargeable coagulate should take place in a single operation.

Depending on the type of installation involved, the paint coagulant used is either one by which the paint coagulate floats in the settling basin, enabling the coagulate to be skimmed off the surface of the water, or one by which the paint coagulate settles and is subsequently removed from the bottom of the basin by means of a scraper belt.

Numerous neutral and alkaline products are available for coagulating conventional paints used above all in the automotive industry. In order to achieve coagulation, that is detackification of the paint particles and their agglomeration into a dischargeable coagulate, alkaline powdery products and alkaline liquid products and also powdery neutral products have hitherto been added to the circulating water.

Thus, GB Patent No. 1,512,022 describes flocculating agents, i.e. agents which cause particles to agglomerate under the effect of intermolecular bridgeforming macromolecules. These flocculating agents consist of inorganic metal salts acting as clarifying agents, such as ferric sulfate iron-(II) chloride or aluminum sulfate, and of organic cationic polymers, such as polyvinyl pyridine or polyamines in aqueous solution. Additives for rinsing liquids for coagulating paints and primers are described in GB Patent No. 1,068,660. They contain water-soluble alkali and/or alkaline-earth metal salts, sparingly water-soluble hydroxides of polyvalent metals, such as magnesium, iron, aluminum or chromium, and also aliphatic or cycloaliphatic amines.

Agents for separating and sedimenting paint particles, which agents contain aliphatic carboxylic acids with 12 or more carbon atoms or alkali, ammonium or alkanolamine salts thereof and also foam inhibitors are described in DE-AS No. 23 47 068. Aqueous solutions for deactivating overspray, containing alkalis and organic amines or alkanolamines containing $C_2$–$C_{10}$ organyl groups are described in U.S. Pat. No. 3,723,148. Alkanolamines which are present together with metal salts and polyether polyamines in aqueous solutions, for detackified paint spray particles and for clarification of the water circulating in paint spray cubicles are also described in U.S. Pat. No. 3,990,986.

Hitherto, there have been no suitable coagulating agents for two-component polyurethane lacquers which, in recent years, have been used to an increasing extent in the automotive industry. Previously, polyurethane lacquers have been applied together with other standard paints so that the coagulating agents currently available still show a more or less satisfactory effect in coagulating any overspray of such paint mixtures. However, it has not been possible to properly coagulate pure polyurethane lacquers with the neutral and alkaline products hitherto used. The coagulate sticks, adheres to the walls and cannot be satisfactorily discharged through the usual systems. The poor coagulation of the polyurethane lacquer residues leads after a few hours—depending on the polyurethane system used—to rock hard agglomerations of polyurethane lacquer which are difficult if not impossible to remove and which can bring the entire disposal network of the lacquering system to a standstill.

In addition to their ineffectiveness for the coagulation of polyurethane lacquers, known neutral and alkaline coagulating agents also have other disadvantages when they are used for coagulating conventional lacquers. They require a relatively long time to coagulate the lacquer spray particles and for them to be completely removed from the water used for discharging overspray. In unfavorable cases, this results in the deposition of lacquer particles adhering to one another in pipelines immediately after the spray cubicle. In addition, most of the known coagulating agents contain substances, such as for example inorganic anions (chloride, sulfate), which accumulate in the circulating water and have a corrosive effect upon various parts of the installation. Since it is desirable for reasons of water consumption to prolong the useful life of the disposal baths, the use of rapidly accumulating substances which interfere with the operation of the installation for various reasons is undesirable because it necessitates frequent changing of the baths.

OBJECTS OF THE INVENTION

An object of the invention is to provide agents for the problem-free coagulation of lacquers and other organic coating compositions, more particularly for the coagulation of two-component polyurethane lacquers.

Another object of the invention is the development of a coagulating composition for coagulating lacquers, waxes and coating compositions comprising customary components of coagulating agents and a coagulation improving amount of a cyanamide component selected from the group consisting of cyanamide, dicyanodiamide, salts of cyanamide and mixtures thereof.

A further object of the present invention is the development of the process for substantially removing the tackiness of the overspray from lacquers, waxes and coating compositions comprising contacting the overspray from lacquers, waxes and coating compositions with an aqueous solution containing from 1 to 50 ppm of a coagulation composition comprising customary components of coagulating agents and a coagulation improving amount of a cyanamide component selected from the group consisting of cyanamide, dicyanodiamide, salts of cyanamide and mixtures thereof and separating coagulated detackified lacquers, waxes and coating compositions from said aqueous solution.

These and other objects of the invention will become more apparent as the description thereof proceeds.

DESCRIPTION OF THE INVENTION

The coagulating compositions of the invention are intended to enable the circulation baths to operate for long periods without any accumulation in them of corrosive or otherwise harmful compounds. In addition, the agents in question are intended to bring about rapid and effective coagulation which even prevents blockages and clogging in pipes immediately beyond the spray cubicle.

The present invention therefore relates to a coagulating composition for coagulating lacquers, waxes and coating compositions comprising customary components of coagulating agents and a coagulation improving amount of a cyanamide component selected from the group consisting of cyanamide, dicyanodiamide, salts of cyanamide and mixtures thereof; as well as the process for substantially removing the tackiness of the overspray from lacquers, waxes and coating compositions comprising contacting the overspray from lacquers, waxes and coating compositions with an aqueous solution containing from 1 to 50 ppm of the above coagulating composition and separating coagulated detackified lacquers, waxes and coating composition from said aqueous solution.

More particularly the present invention relates to agents for coagulating lacquers, waxes and coating compositions, particularly two-component polyurethane lacquers, which contain a mixture of cyanamide, dicyanodiamide and/or calcium cyanamide in conjunction with substances of the type normally present in coagulating agents.

Surprisingly, extremely effective coagulation of lacquers and other organic coating compositions, particularly two-component polyurethane lacquers, is obtained using a composition containing cyanamide, dicyanodiamide (1-cyanoguanidine) or calcium cyanamide in aqueous solution at pH-values of from 3 to 12 and preferably from 6.5 to 8.5. In addition to surprisingly good detackification of the lacquer spray particles and agglomeration to form a dischargeable coagulate, the cyanamides mentioned above have the advantage that they dissolve slowly, continuously and completely in water and break down to form $NH_3$ and $CO_2$ and, accordingly, do not pollute the circulating water in any way. The ammmonia formed, both in solution and also in the fume chamber, is effective as a corrosion inhibitor for components of the installation made of iron and steel.

The compositions used for coagulating lacquers and coating compositions contain one or more of the above-mentioned cyanamides in a quantity of from 1 to 80% by weight and preferably in a quantity of from 5 to 15% by weight.

In addition these compositions contain the customary components of coagulation agents such as discussed above and include polyethylene imines and their cationically modified derivatives; viscosity controllers such as calcium and/or magnesium compounds, preferably water-insoluble calcium and/or magnesium compounds; coagulation promoters such as sodium aluminum layer silicates, sawdust or silicia; buffering compounds; antimicrobials; corrosion inhibitors and foam inhibitors.

The polyethylene imines used in the formulations according to the invention are present either as such or are cationically modified by protonation or by alkylation, generally by methylation, of the nitrogen or converted into the corresponding ammonium salts.

The degree of modification varies and depends upon the neutral starting polymer, upon the corresponding acid used for protonation or upon the corresponding alkylating agent. Tertiary nitrogen atoms are not completely protonated or alkylated. It is possible to use protonated and/or methylated polyethylene imines of which the molecular weights are in the range from about $5 \times 10^4$ to $5 \times 10^7 D$ and preferably in the range from $7.5 \times 10^4$ to $5 \times 10^6 D$. The coagulating agents contain the polyethylene imines mentioned in a quantity of from 1 to 20% by weight and preferably in a quantity of from 1 to 4% by weight.

Since a high viscosity of the circulating water impairs or completely neutralizes the effect of the coagulating agents used, it is of advantage to add to the formulations according to the invention substances which prevent any increase in viscosity and which, accordingly, enable the lacquer spray particles to be coagulated without interruption from the outset at normal viscosities. According to the invention, therefore, calcium and/or magnesium compounds are added to the coagulating agents because, surprisingly, they bring about regeneration of maintenance of the required viscosity either on their own or in synergism with the polyethylene imines. To this end, it is possible to use water-insoluble calcium compounds, for example calcium carbonate or phosphate, which do not pollute the water with corrosive ions and which, accordingly, effectively satisfy the need to prolong the useful life of the circulation system. However, it is also possible effectively to use ionic compounds, for example calcium nitrate or hydroxide. It is preferred to use non-corrosive calcium compounds, such as calcium carbonate or hydroxide. The calcium compounds, which are added in a quantity of from 1 to 95% by weight and preferably in a quantity of 30 to 50% by weight, may be completely or partly replaced by the corresponding magnesium compounds which is of advantage in the coagulation of certain types of lacquers.

To promote the coagulating effect, sodium aluminum layer silicates, such as for example montmorillonite or bentonite, and/or sawdust and/or silicas, for example silicas of the Ultrasil* or Aerosil* type (products of DEGUSSA AG, Frankfurt, Germany) are added to the coagulating agents according to the invention, particularly in cases where oversprays of solvent-containing lacquer systems are to be coagulated. The quantities in which these additives are present in the coagulating agents vary between 1 and 95% by weight and preferably between 10 and 30% by weight.

* Trademark

Special requirements, such as for example the adjustment to certain pH-value or the antimicrobial protections of the coagulating agents, may be satisfied by the introduciton of special additives into the agents. Thus, it is possible to add boric acid which has an antimicrobial effect and may even contribute towards pH-adjustment, and also biocides, for example formaldehyde, isothiazolines and derivatives thereof as well as pyridine-N-oxide and derivatives thereof. Phosphoric acid, organic acids, such as citric acid, or other non-corrosive acids and acid salts thereof may also be used for pH-adjustment, being added in a quantity of from 1 to 40% by weight and preferably in a quantity of from 5 to 25% by weight.

Corrosion inhibitors and foam inhibitors are other possible ingredients of the coagulating agents according to the invention. The corrosion inhibitors used include water-soluble salts of phosphonic acids and zinc salts, preferably the sodium salt of 2-phosphonobutane-1,2,4-tricarboxylic acid or the zinc salt of 2-pyridinethiol-1-oxide. In addition to known foam inhibitors, Dehydran F* (a Henkel product) may be used for foam suppression.

* Trademark

The coagulating agents according to the invention are suitable for coagulating paints of all the usual types and organic coating compositions (waxes, underbody protection). They are particularly suitable for coagulating two-component polyurethane lacquers in the pH-range from 3 to 12 and preferably from 6.5 to 8.5. In every case, coagulation is obtained very rapidly, i.e. the lacquer particles entrained in the circulating water are very quickly separated without adhering to any parts of the installation. Loose, mainly sand-like coagulate particles are formed and are carried along rapidly by the flow of the circulating water without blocking the pipes.

The coagulating agents may be used for flotation or even for sedimentation of the coagulate particles in the settling basin.

If a special type of installation calls for sedimentation of the coagulate, it is possible to add to the coagulating agents according to the invention mixed formals or mixed ethers which have the advantage over known nonionic surfactants used for this purpose that they do not lead to the formation of any foam at the temperatures at which the coagulation process takes place (10° to 30° C.).

Mixed formals, for example as described in U.S. Pat. No. 4,418,217, are components having the formula $$R^1-O-(AO)_m-CH_2-(OB)_nOR^2$$

wherein $R^1$ is an alkyl of a fatty alcohol containing from 8 to 22 carbon atoms, $R^2$ is a $C_1$-$C_5$-alkyl, A and B are ethylene or isopropylene and m and n are integers from 1 to 4. The mixed ethers have the formula $$R^3-O-(AO)_p-R^4$$

wherein $R^3$ and $R^4$ are alkyls of fatty alcohols containing from 4 to 14 carbon atoms, A has the above meaning, and p is an integer of from 6 to 30. The coagulating agents according to the invention optionally contain mixed formals of mixed ethers such as these in a quantity of from 0 to 15% by weight, more particularly from 1 to 15% by weight, and preferably in a quantity of from 2 to 5% by weight.

If, however, flotation of the coagulate particles in the settling basin is to be obtained, silicates and/or phosphates are added to the lacquer coagulants in a quantity of from 1 to 30% by weight and preferably in a quantity of from 3 to 10% by weight. The silicates used for this purpose are for example, waterglasses or soluble or insoluble salts of orthosilicic acid and condensation products thereof or dehydrated derivatives thereof (metasilicic acids). The phosphates used are soluble or insoluble salts of orthophosphoric acid and condensation products thereof or dehydrated derivatives thereof.

The lacquer coagulants according to the invention are prepared by mixing the corresponding active substances in the ratios indicated. The mixtures thus prepared may be brought into the required liquid concentrate form or suspension form in due course or in situ simply by dissolution or suspension in the particular quantity of water and added in that form to the circulating water. They are best added to the circulating water at a point where it is in a state of vigorous turbulence, i.e. near the circulation pump, in order to guarantee rapid distribution.

The coagulating agents according to the invention are introduced either continuously by means of suitable metering units or in batches, for example once a day. In that case, the coagulating agents according to the invention are added to the circulating water in such a quantity that the total content of all components amounts to between 1 and 50 ppm per hour of operating time of the installation. This corresponds to a quantity of from 1 to 50 g per m³ of the circulating water present in the installation per hour.

The invention is illustrated by the following Examples.

The following are Examples for the powdery coagulating agents according to the invention, the figures representing percentages by weight:

EXAMPLE 1

8.0% of cyanamide
32.0% of calcium carbonate
28.0% of calcium phosphate
20.0% of sawdust
10.0% of bentonite
2.0% of protonated polyethylene imine (MW: approx. $2 \times 10^5$D) in the form of a 50% aqueous solution (Super Floc C 577 ®, a product of the American Cyanamid Co., New York).

EXAMPLE 2

10.0% of dicyanodiamide
11.0% of calcium hydroxide
48.0% of calcium carbonate
18.0% of bentonite
3.0% of protonated polyethylene imine (MW: approx. $2 \times 10^5$D) in the form of a 50% aqueous solution (Super Floc C 577 ® a product of the American Cyanamid Co., New York).
7.0% of boric acid
3.0% of butyl glycol formal corresponding to the formula $$C_{12-14}H_{25-29}-O-(CH_2CH_2O)_4-CH_2-(OCH_2CH_2)-OC_4H_9$$

EXAMPLE 3

13.0% of calcium cyanamide
20.0% of calcium carbonate
14.0% of calcium oxide
18.0% of magnesium carbonate
12.0% of silica (Aerosil*, a product of DEGUSSA, Frankfurt)
2.0% of protonated polyethylene imine (MW: approx. $2 \times 10^5$D) in the form of a 50% aqueous solution (Super Floc C 577*, a product of the American Cyanamid Co., New York).
20.0% of sodium dihydrogen phosphate
1.0% of an isothiazoline derivative (Kathon 886 MW ®, a product of Rohm and Haas, Philadelphia)

* Trademark

EXAMPLE 4

6.0% of a 50:50 mixture of cyanamide and dicyanodiamide
20.0% of calcium hydroxide
20.0% of aluminum sulfate
0.5% of polyacrylamide
49.0% of bentonite
2.0% of talcum
2.5% of adipic acid

EXAMPLE 5

7.0% of cyanamide
3.0% of talcum
2.4% of adipic acid
20.0% of aluminum sulfate
20.0% of bentonite
0.6% of polyacrylamide
17.0% of calcium oxide

EXAMPLE 6

43.0% of calcium carbonate
38.0% of sodium sulfate
9.0% of sodium carbonate
5.0% of potassium hydroxide
5.0% of calcium cyanamide

EXAMPLE 7

5.0% of mineral oil
15.0% of sodium carbonate
12.5% of sodium dihyrogen phosphate
24.0% of aluminum sulfate
12.5% of sodium chloride
22.0% of calcium carbonate
9.0% of 1-cyanoguanidine (dicyanodiamide)

EXAMPLE 8

4.0% of dicyanodiamide (1-cyanoguanidine)
4.0% of calcium cyanamide
4.0% of cyanamide
5.0% of soda waterglass (Portil AW ®)
7.0% of calcium hydroxide
25.0% of calcium oxide
12.0% of magnesium carbonate
24.0% of bentonite
9.0% of boric acid
4.0% of 2-phosphonobutane-1,2,4-tricarboxylic acid
1.0% of Dehydran F ®
1.0% of Kathon 886 MW ®

EXAMPLE 9

Test-coagulating process in pilot plant scale

Equipment: 1 m³-volume of water
Product dose: 2% related to Overspray (2% conforms to conventional practice)
100 gm of powdery product according to Example 4 are suspended in circulating water (1 m³) by circulating pump. From a lacquer spray gun equal amounts of 5 kg of the mixed lacquer is sprayed on the water surface. The coagulating effect is almost immediately ascertainable after a few minutes of observation. The lacquer coagulates. The formed coagulant can be manually pressed together without sticking. The produced lacquer coagulant is discharged problem free. The small amounts of the coagulant remaining on the walls of the equipment can be effortlessly sprayed off with a water spray.

In testing the following lacquers were used:
I. 2-components-polyurethane lacquer from Bayer, Leverkusen
  (a)
    component 1: clear lacquer CLW 31209/4
    component 2: Desmodur Z 4370
    Weight ratio 1:2=100:34.6
  (b)
    component 1: Desmophen KL5
    component 2: Desmodur N 3390
    Weight ratio 1:2=75:25
II. Metallic-water lacquer type 30078, BASF
III. 2-component-high solid Clear lacquer, type 16168/23343, BASF All of these lacqers were coagulated problem free.

The other compositions of Examples 1-3 and 5-8 work in the same manner.

As indicated above, the total amount of the lacquer is sprayed on the circulating water. However in practice, the main amount of the lacquer is sprayed on the surface to be lacquered, i.e. the automobile body and remains thereon and only the so-called "overspray" is coagulated in this manner. Further in practice the respective coagulating product is added in measured quantities during the entire time of the operation of the equipment since it is carried out of the equipment with the coagulated lacquer.

In the above example, however, the entire amount of the coagulating agent was introduced into the circulating water.

The preceding specific embodiments are illustrative of the practice of the invention. It is to be understood however that other expedients, known to those skilled in the art, or disclosed herein, may be employed without departing from the spirit of the invention or the scope of the appended claims.

Dehydran F* is a foam inhibitor, containing mineral oil, Aerosil*, metalic soaps and carboxylic acid derivatives.

I claim:

1. A coagulating composition for coagulating lacquers, waxes and coating compositions consisting essentially of
   (a) from 1% to 80% by weight of a cyanamide component selected from the group consisting of cyanamide, dicyanodiamide, calcium cyanamide and mixtures thereof,
   (b) from 1% to 95% by weight of a sodium aluminum layers silicate selected from the group consisting of montmorillonite, bentonite and mixtures thereof,
   (c) from 2% to 5% by weight of ethers selected from the group consisting of mixed formals having the formula $$R^1-O-(AO)_m-CH_2-(OB)_n-O-R^2$$

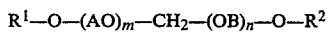

wherein $R^1$ is an alkyl of a fatty alcohol containing from 8 to 22 carbon atoms, $R^2$ is a $C_1$–$C_5$-aklyl, A and B are ethylene or isopropylene, and m and n are integers from 1 to 4, mixed ethers having the formula $$R^3-O-(AO)_p-R^4$$

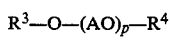

wherein $R^3$ and $R^4$ are alkyls of fatty alcohols containing from 4 to 14 carbon atoms, A has the above meaning, and p is an integer of from 6 to 30, and mixtures thereof.

2. The coagulating composition of claim 1 having a further content of from 1% to 4% of a polyethylene imine cationically modified by methylation or protonation and having molecular weights in the range of from $5 \times 10^4$ to $5 \times 10^7 D$.

3. The coagulating composition of claim 2 wherein said molecular weight is in the range of from $7.5 \times 10^4$ to $5 \times 10^6 D$.

4. The coagulating composition of claim 1 having a further Cfoam inhibiting amount of foam inhibitors.

5. A process for substantially removing the tackiness of the overspray from lacquers, waxes and coating compositions comprising contacting the overspray from lacquers, waxes and coating compositions with an aqueous solution containing from 1 to 50 ppm of the coagulating composition of claim 1, and separating coagulated detackified lacquers, waxes and coating compositions from said aqueous solution.

6. The process of claim 5 wherein said overspray is from twocomponent polyurethane lacquers.

7. A coagulating composition for coagulating lacquers, waxes and coating compositions consisting essentially of
   (a) a cyanamide component selected from the group consisting of cyanamide, dicyanodiamide, calcium cyanamide and mixtures thereof in an amount of from 5% to 15% by weight,
   (b) viscosity controlling calcium and/or magnesium compounds in an amount of from 30% to 50% by weight,
   (c) a polyethylene imine cationically modified by methylation or protonation and having molecular weights in the range of from $5 \times 10^4$ to $5 \times 10^7 D$, in an amount of from 1% to 4% by weight,
   (d) sodium aluminum layer silicates selected from the group consisting of montmorillonite, bentonite and mixtures thereof, in an amount of from 10% to 30% by weight,
   (e) inorganic and/or organic acids or acid salts thereof in an amount of from 5% to 25% by weight, and
   (f) ethers selected from the group consisting of mixed formals having the formula $$R^1-O-(AO)_m-CH_2-(OB)_n-O-R^2$$

wherein $R^1$ is an alkyl of a fatty alcohol containing from 8 to 22 carbon atoms, $R^2$ is a $C_1$-$C_5$-alkyl, A and B are ethylene or isopropylene, and m and n are integers from 1 to 4, mixed ethers having the formula $$R^3-O-(AO)_p-R^4$$

wherein $R^3$ and $R^4$ are alkyls of fatty alcohols containing from 4 to 14 carbon atoms, A has the above meaning, and p is an integer of from 6 to 30, and mixtures thereof, in an amount of from 2% to 5% by weight, and
   (g) alkali metal silicates and/or phosphates in an amount of from 0 to 10% by weight.

* * * * *